Feb. 17, 1970  ISAO MAKINO ET AL  3,496,369
RADIATION SENSITIVE LIQUID SAMPLE INSPECTING APPARATUS
Filed March 12, 1968  3 Sheets-Sheet 1

INVENTORS
ISAO MAKINO, HACHIRO HIGO,
NOBUMITSU UKUMA, MINEHARU HASHIMOTO
BY
Craig & Antonelli
ATTORNEYS Feb. 17, 1970    ISAO MAKINO ET AL    3,496,369
RADIATION SENSITIVE LIQUID SAMPLE INSPECTING APPARATUS
Filed March 12, 1968    3 Sheets-Sheet 3

INVENTORS
ISAO MAKINO, HACHIRO HIGO,
NOBUMITSU UNUMA, MINEHARA
BY                    HASHIMOTO

*Craig & Antonelli*
ATTORNEYS

United States Patent Office 3,496,369
Patented Feb. 17, 1970

3,496,369
RADIATION SENSITIVE LIQUID SAMPLE
INSPECTING APPARATUS
Isao Makino and Hachiro Higo, Mito-shi, and Nobumitsu Unuma and Mineharu Hashimoto, Katsuta-shi, Japan, assignors to Hitachi, Ltd., Tokyo, Japan, a corporation of Japan
Filed Mar. 12, 1968, Ser. No. 712,489
Claims priority, application Japan, Mar. 15, 1967, 42/15,795
Int. Cl. G01n 21/26; G06m 7/00
U.S. Cl. 250—218                                12 Claims

ABSTRACT OF THE DISCLOSURE

A sample inspecting apparatus comprising means for directing light to an ampoule and detecting the light scattered by foreign particles such as dust existing in a liquid sample in the ampoule. The ampoule is inspected $m$ ($m \geq 2$) times by said means. When the intensity of the scattered light exceeds a predetermined value $n$ times out of the $m$ measurements, the ampoule is regarded as a defective. The number $n$ can be set at any value equal to or larger than 1.

---

The present invention relates to an apparatus for inspecting liquid samples put in vessels such as ampoules or vials to separate them into defective and non-defective ones, and more particularly to an apparatus for inspecting the samples by measuring light scattered by possible foreign particles such as dust, glass splinters, fibers or the like existing in the samples.

An apparatus for optically inspecting liquid samples (hereinafter referred to only as samples for the sake of simplicity) put in vessels such as ampoules or vials to separate them into defective and non-defective ones generally includes means for directing light to the samples and measuring the light scattered by possible foreign particles existing in the samples. However, such a measurement is usually made only once for each sample.

As a criterion for classifying the samples into defective and non-defective ones, the concept "defective selection characteristic" which will be defined later can be employed. Although such a classification of samples can be made by an inspector, the defective characteristic of the human eye differs depending on individuals and the kinds of samples.

It is desirable for the defective selection characteristic of a sample inspecting apparatus to approximate that of the human eye. However, since the defective selection characteristic of the human eye is not necessarily invariable as mentioned above, it is an important technical problem to make the defective selection characteristic of the sample inspecting apparatus variable, depending upon defective probability distributions of actual lots of ampoules or depending upon use conditions.

However, a sample inspecting apparatus having measuring means capable of effecting measurement only once for each sample as mentioned above has the disadvantage that it cannot have various defective selection characteristics.

It is an object of the present invention to provide a sample inspecting apparatus having a defective selection characteristic capable of being varied to a great extent in many respects.

It is another object of the present invention to provide a sample inspecting apparatus the defective selection characteristic of which can approximate that of the human eyes as the case may be.

It is a further object of the present invention to provide a sample inspecting apparatus the defective selection characteristic of which can approximate an ideal defective selection characteristic if necessary.

According to the present invention there is provided a sample inspecting apparatus for inspecting a liquid sample in a vessel, comprising: means for imparting a movement to the sample so as to float possible foreign particles in the sample; measuring means for directing light $m$ ($m \geq 2$) times to the samples so as to measure the sample $m$ times and detecting the light scattered by the floating foreign particles each time the measurement is performed, the sample being regarded as defective when the intensity of the scattered light exceeds a predetermined value $n$ times out of the $m$ measurements; and defective selection setting means for setting the number $n$ at a value equal to or larger than one.

Other objects and features of the present invention will become apparent from the following description of the invention with reference to the accompanying drawings.

Figure 1:
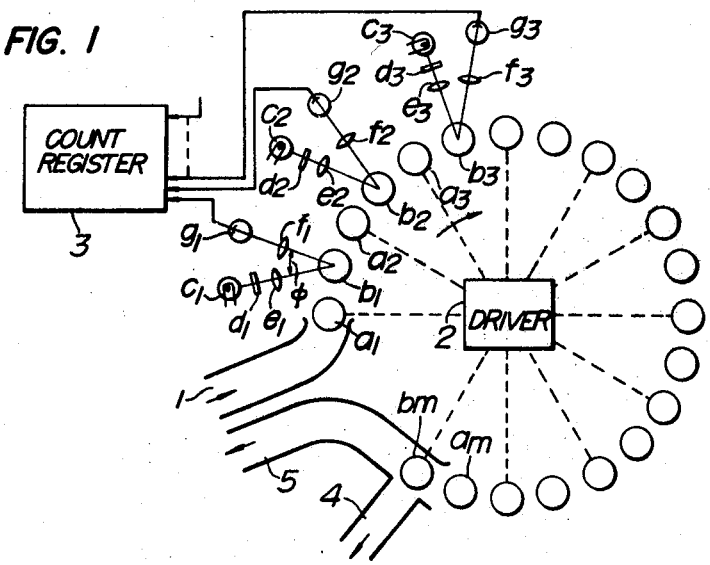
FIG. 1 is a schematic diagram of an embodiment of the sample inspecting apparatus of the invention.

A sample to be inspected is any liquid sample put in a vessel having a portion capable of transmitting light. The vessel is assumed to be an ampoule by way of description. Referring to FIG. 1, an ampoule containing a sample to be inspected therein is led to a sample driving means $a_1$ through a sample inlet port 1. At the sample driving means $a_1$ a certain movement is imparted to the sample. The movement imparted to the sample is of such a degree as to float foreign particles such as dust, glass splinters, fibers or the like which may exist in the sample. Such a movement may be imparted to the sample by applying ultrasonic waves thereto, or by directly rotating the ampoule. By way of description, here it is assumed that the movement is imparted by rotating the ampoule.

Sample driving means $a_1, a_2, \ldots, a_m$ and inspecting means $b_1, b_2, \ldots, b_m$ are arranged alternately. The ampoule led to the sample driving means $a_1$ is transferred successively and intermittently to $b_1, a_2, b_2, a_3, b_3, \ldots, a_m, b_m$ by means of a conventional driver 2. Although in FIG. 1 the sample driving means $a_1, a_2, \ldots, a_m$ and the light directing means $b_1, b_2, \ldots, b_m$ are arranged alternately along the circumference of a circle as an example, they may be arranged alternately along a line, if necessary.

Rays of light emitted from light sources $c_1, c_2, \ldots, c_m$ are directed to light filters $d_1, d_2, \ldots, d_m$ which transmit only rays of light within a specified wavelength region. The transmitted light is focused on the inspecting portions $b_1, b_2, \ldots, b_m$ by means of condenser lenses $e_1, e_2, \ldots, e_m$. When the ampoule is at the position $b_1$ and if foreign particles such as dust, glass splinters, fibers or the like are present in the sample, the light directed to the sample is scattered by the foreign particles. The scattered light is focused with a condenser lens $f_1$ on a detector $g_1$ from which an electrical signal is derived in response to the intensity of the scattered light. The same is true also at positions $b_2, b_3, \ldots, b_m$. Each of the optical axes from the light sources $c_1, c_2, \ldots, c_m$ through the light filters $d_1, d_2, \ldots, d_m$ and the condenser lenses $e_1, e_2, \ldots, e_m$ to the inspecting portions $b_1, b_2, \ldots, b_m$ forms an angle $\phi$ with each of the corresponding optical axes from the inspecting portions $b_1, b_2, \ldots, b_m$ through condenser lenses $f_1, f_2, \ldots, f_m$ to detectors $g_1, g_2 \ldots, g_m$ in order to prevent the light beam directed to the inspecting portions $b_1, b_2, \ldots, b_m$ from directly projecting upon the detectors $g_1, g_2, \ldots, g_m$.

The sample is inspected only at the positions $b_1, b_2, \ldots, b_m$ after the sample has been subjected to rotation at the sample driving means $a_1, a_2, \ldots, a_m$. Although the rotation of the ampoule is suspended at the positions $b_1, b_2, \ldots, b_m$ the sample is still rotating due to its inertia, during which the inspection is made. If there are foreign particles in the sample, the foreign particles are caused to float in the sample. Therefore, the light scattered by the floating particles and detected by the detector constitutes an AC component of the output of the detector, while the light scattered by the surface of the ampoule constitutes a DC component of the output of the detector. Thus, it is possible to distinguish the light scattered by the foreign particles from the light scattered by the surface of the ampoule.

The detectors $g_1, g_2, \ldots, g_m$ are connected with a count register 3 which is adapted to set a defective selection frequency (defined below) at any value. Since the number of the inspecting portions $b_1, b_2, \ldots, b_m$ is $m$ ($m \geq 2$), each sample is inspected $m$ times. It is assumed that a sample is regarded as a defective sample when $n$ ($0 < n \leq m$) output signals from $n$ detectors out of the $m$ detectors $g_1, g_2, \ldots, g_m$ exceed a predetermined value. Then the number $n$ is expediently defined as the defective selection frequency. Also the output signal of the detector exceeding the predetermined value is defined as a defective signal. Thus, if $n$ defective signals are fed to the count register 3 when a sample is inspected $m$ times, the sample is defective. After the completion of $m$ measurements or inspections of a sample the sample is delivered by a known mechanism from the position $b_m$ through a non-defective outlet 5 if the sample is a non-defective, or through a defective outlet 4 if the sample is a defective. The count register 3 delivers a signal to transfer a sample from the position $b_m$ through the defective outlet 4 when $n$ defective signals are fed to the count register 3 during $m$ measurements. A circuit for counting the number of signals and for generating a certain signal after a predetermined time after the count has reached a predetermined amount is known. Accordingly, the construction of the count register 3 is not described here.

Now, if the probability that a sample is selected as a defective when the number of measurements is 1 ($m=1$) is P, and if the probability that a sample is selected $n$ ($0 < n \leq m$) times as a defective when the number of measurements is $m$ ($m \geq 1$) is $P(m, n)$, the defective selection probability is represented as $$P(m,n) = \sum_{k=n}^{m} {}_nC_k P^k (1-P)^{n-k} ; \ (0 \leq P \leq 1)$$

where ${}_nC_k$ is the number of combinations of $k$ elements selected from $m$ elements, and P is an index (described later). As is evident from the above formula, the defective selection probability $P(m, n)$ is a function of the number of measurements $m$ and the number of defective selection $n$. By selecting the values of $m$ and $n$, any defective selection characteristic can be obtained.

Figure 2:
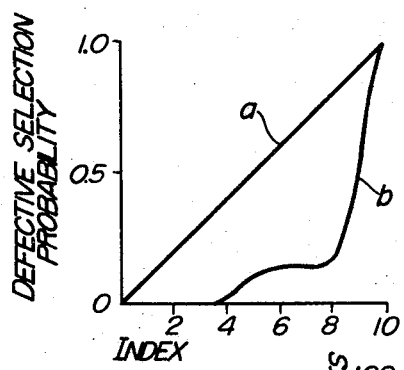
FIG. 2 is a graph showing defective selection characteristics of the apparatus of FIG. 1 set at $m=1$ and the human eye.
Figure 3A:
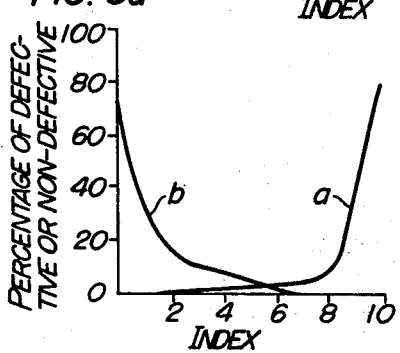
FIGS. 3a and 3b are graphs showing index distribution curves necessary for obtaining the defective selection characteristic of the human eye in FIG. 2.
Figure 3B:
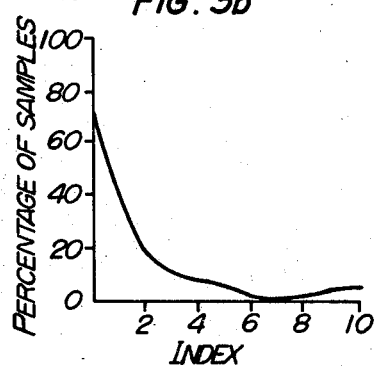
Figure 4A:
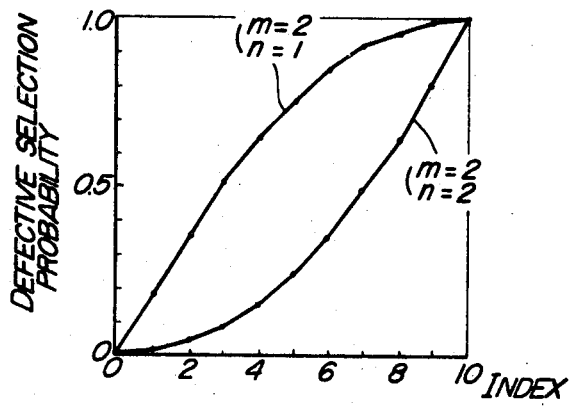
FIGS. 4a to 4e are graphs showing various defective selection characteristics of the apparatus of FIG. 1 obtained by selecting various values of $m$ and $n$.
Figure 4B:
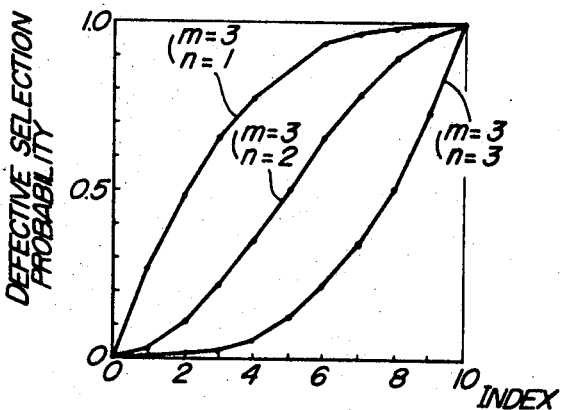
Figure 4C:
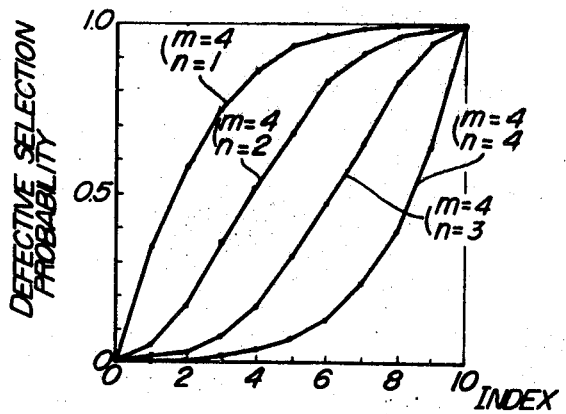
Figure 4D:
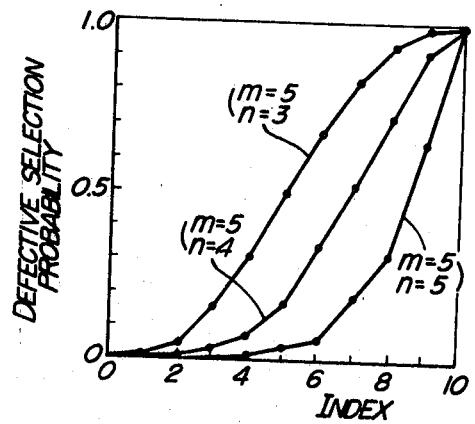
Figure 4E:
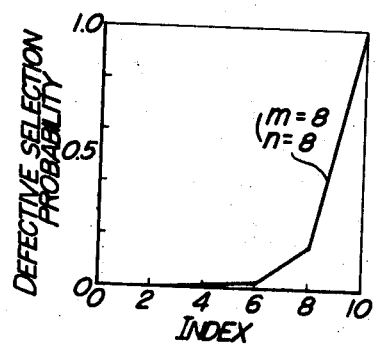

When a sample is found to be defective R times in ten measurements made by the above described apparatus which is set at $m=1$, the number R is defined as the index which corresponds to the probability P by a relation; $10P=R$. If the index R is represented on the abscissa and the defective selection probability $P(m, n)$ is represented on the ordinate, an example of the defective selection characteristic of the human eye relative to the defective selection characteristic of the above-mentioned apparatus which is set at $m=1$ is as shown in FIG. 2. In FIG. 2, a curve $a$ is the defective selection characteristic of the apparatus set at $m=1$ and a curve $b$ is that of the human eye or naked eye. The defective selection characteristic of the naked eye was determined as follows. 331 ampoules which are found to be defective by the naked eye and 160 ampoules which are found to be non-defective were prepared out of a lot of $x$ ampoules. Distributions of these defectives and non-defectives with respect to the index R(0, 1, 2, ..., 10) (hereinafter referred to as index distribution) were first determined by the apparatus set at $m=1$. The result is as shown in FIG. 3a. A curve $a$ is the defective index distribution curve and a curve $b$ is the non-defective index distribution curve. Assuming that the number of ampoules which a skilled inspector can determine as defectives out of the $x$ unknown ampoules is 5% of the total $x$, the number $x$ of the ampoules of the lot is calculated to be 6620(=331/0.05), from which the number of non-defectives in the lot is known to be 6620−331=6289. Then the index distributions of 6289 non-defectives and the total of 6620 ampoules of the lot in the case of the apparatus set at $m=1$ were calculated. The former can be obtained by a proportional calculation based on the defective index distribution $a$ in FIG. 3a, while the latter can be obtained by adding the index distribution of the 6289 non-defectives and the defective index distribution $a$ in FIG. 3a. The latter index distribution is shown in FIG. 3b. It will be noted that the latter index distribution corresponds to the actual lot distribution plotted against the probability P. Finally, the ratio of the defective index distribution $a$ in FIG. 3a to the index distribution of the total number of FIG. 3b was plotted, which gave the defective selection characteristic $b$ in FIG. 2.

As is evident from FIG. 2, the defective selection characteristic of the apparatus set at $m=1$ is by far apart from that of the naked eye. However, by appropriately selecting $m$ and $n$ the defective selection characteristic of the apparatus can approximate that of the naked eye.

Various selection characteristics can be obtained by selecting various values for $m$ and $n$, examples of which are shown in FIGS. 4a to 4e. When $m=8$ and $n=8$, the characteristic approximates the naked eye characteristic $b$ in FIG. 2. From FIGS. 4a to 4e it will be understood that the larger the values of $m$ and $n$ are, the steeper the rise of the defective selection characteristic is. From a practical point of view, values of $m$ and $n$ may be determined in consideration of actual defective probability distributions of lots of ampoules in a particular line or factory to which this inspection apparatus will be applied so that the sensitivity of selection of the inspecting apparatus may approximate that of inspectors in the particular line or factory.

In fact a liquid sample in an ampoule sometimes contains foreign particles such as dust, glass splinters, fibers or the like which are different in kind, shape, and size. These foreign particles are necessary to be properly floated in the sample. It was experimentally found by the inventors that a very effective method for that purpose is to vary the rotational speed of the ampoule at each time of measurement. For example, in the case of $m=2$ and $n=1$, the ampoule is rotated at a high speed at the first measurement, and rotated at a lower speed at the second measurement. Then, at the first measurement the liquid sample existing at the neck portion (described later) of the ampoule effectively falls and, at the same time, relatively heavy foreign particles such as glass splinters are caused to float, and at the second measurement relatively light particles such as dust and textile fibers are caused to properly float, whereby the defective selection characteristic can approximate that of the human eye. Accordingly, it was found that by use of different rotations, various foreign particles can be detected equally and there is no case occurred where certain kinds of foreign particles can be detected but the other kinds cannot be detected. According to experimental results obtained by the present inventors, it was further found that especially when $m=2$, $n=1$, not only relatively heavy foreign particles (glass splinters) but also relatively light foreign particles (dust, fibers) can be effectively detected if the ampoule is rotated at 2,800 r.p.m. at the first measurement and at 1,800 r.p.m. at the second measurement. Of course, preferred revolution of the ampoule may differ, depending upon size and shape of the ampoules as well as viscosity of the sample contained therein. In the experiments, however, the revolution at the first measurement is preferably 2,600–3,000 r.p.m., the revolution at the second measurement is preferably 1,600–2,000 r.p.m.

The light filters $d_1, d_2, \ldots, d_m$ in FIG. 1 are important. Since the light scattered by the foreign particles in the liquid sample is faint, it is desirable to employ white light sources as the light sources $c_1, c_2, \ldots, c_m$ in order to obtain intense scattered light. For example, if the ampoule is such a colored vessel as does not transmit light of 600 m$\mu$ or less, the light scattered by the foreign particles in the sample is faint light of 600 m$\mu$ or more, while the light scattered or reflected by the surface of the vessel contains both wavelength regions of above and below 600 m$\mu$. Consequently, if all of the light scattered or reflected by the surface of the vessel is detected by the detector, the signal to noise ratio is markedly lowered. However, if light filters which transmit only light of 600 m$\mu$ or more are employed as the light filters $d_1, d_2, \ldots, d_m$, the scattered or reflected light of 600 m$\mu$ or less from the surface of the vessel is prevented from being detected by the detector, and hence the signal to noise ratio is markedly improved. The light filters $d_1, d_2, \ldots, d_m$ can be provided either between the inspecting portions $b_1, b_2, \ldots, b_m$ and the light sources $c_1, c_2, \ldots, c_m$ or between the inspecting portions $b_1, b_2, \ldots, b_m$ and the detectors $g_1, g_2, \ldots, g_m$.

Figure 5:
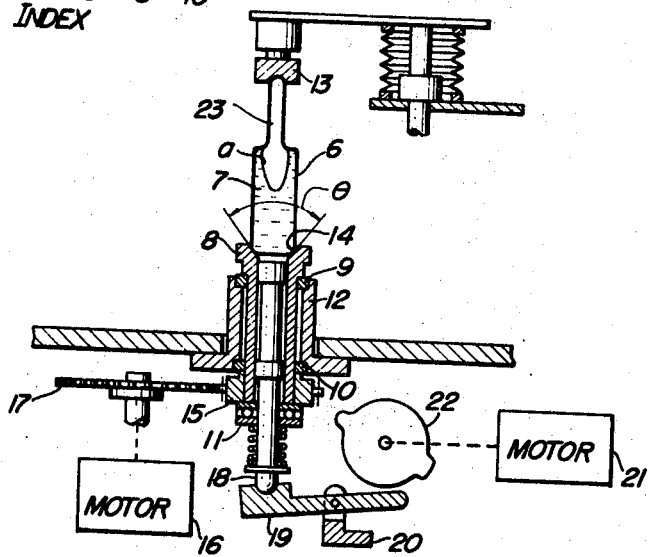
FIG. 5 is a vertical cross-sectional view of a sample driving means in the apparatus of FIG. 1.

FIG. 5 shows an embodiment of one of the sample driving means $a_1, a_2, \ldots, a_m$ of FIG. 1. An ampoule support 8 is rotatably supported in a fixed cylinder 12 by means of guide bearings 9 and 10 and a thrust bearing 11. An ampoule 6 containing a liquid sample or specimen 7 therein is resiliently pressed on the upper surface of the ampoule support 8 by means of an ampoule pressing mechanism 13. The upper surface 14 of the ampoule support 8 is tapered with an angle of $\theta$ so as to make line contact with the ampoule 6. At the lower end of the support 8 is fixed a gear 15 with which a gear 17 directly coupled with a motor 16 engages. The center of the support 8 is bored, into which an ampoule push bar 18 is inserted. One end of a lever 19 pivoted at its center portion on a fixed support 20 engages with the lower end of the ampoule push bar 18, and the other end of the lever 19 is adapted to engage with a cam 22 directly coupled with a motor 21.

When the motor 16 is actuated, the ampoule support 8 is rotated through the gears 17 and 15. Then the ampoule 6 is rotated with the ampoule support 8, whereby the sample which may have been remaining at a neck portion 23 of the ampoule 6 falls. Due to the rotation of the liquid sample 7 accompanying the rotation of the ampoule 6 the surface of the sample 7 becomes concave as designated by $a$. At this time since the stream lines of the whirling flow of the sample are directed to the center of the ampoule 6, if there are foreign particles in the sample, the foreign particles concentrate at the center portion of the ampoule 6. When the cam 22 is rotated by a predetermined amount by the motor 21, the lever 19 is rotated clockwise and pushes the ampoule push bar 18 upward, which in turn pushes the ampoule 6 upward, at which time the ampoule 6 is released from the contact with the support 8 and the rotation thereof is suspended. However, the sample 7 maintains its rotation due to its inertia. Although the sample maintains its rotation even after the rotation of the ampoule 6 is suspended, the rotation of the sample is slower than when the ampoule 6 is rotating, and hence the surface of the sample approaches a flat plane. Consequently, the foreign particles concentrated in the vicinity of the center of the ampoule 6 are apt to rise to the surface. While the sample 7 is rotating due to its inertia the ampoule 6 pushed upward by the ampoule push bar 18 is transferred together with the ampoule pressing mechanism 13 to the inspecting portions $b_1, b_2, \ldots,$ or $b_m$ by means of the driver 2 (FIG. 1).

The generation of bubbles in the sample 7 should be prevented as much as possible, because the generated bubbles scatter light from the light source, resulting in a cause of an error signal. It was found through experimental studies by the inventors that the taper angle $\theta$ of the upper surface 14 of the ampoule support 8 exerted an important influence on the generation of bubbles. More specifically, it was found that when the angle $\theta$ satisfies the condition $0 < \theta \leq 80°$, the generation of bubbles was very slight as compared with the case where $\theta > 80°$. For example, when $\theta = 120°$ the bubble generation ratio was about 10% or even about 20% depending upon the kind of ampoule, whereas when $\theta = 70°$ the ratio was zero. The inventors were unable to elucidate the cause of this fact, but it is conceivable that one cause is that the larger the angle $\theta$ is, the more unstable becomes the support of the ampoule 6 by the surface 14.

Although a preferred embodiment of the invention has been described with reference to the accompanying drawings, it will be easily understood that many changes and modifications can be made without departing from the spirit and scope of the present invention. The present invention is limited only by the appended claims.

What is claimed is:

1. A sample inspecting apparatus for inspecting a fluid sample in a vessel having a portion capable of transmitting light, comprising: means for imparting a movement to the sample so as to float possible foreign particles existing in the sample; measuring means for directing light $m$ ($m \geq 2$) times to the sample so as to measure the sample $m$ times and detecting the light scattered by the floating foreign substances each time the measurement is performed, the sample being regarded as defective when the intensity of the scattered light exceeds a predetermined value $n$ times out of the $m$ measurements; and defective selection means for setting the number $n$ at a value equal to or larger than one.

2. A sample inspecting apparatus according to claim 1, wherein the means for imparting a movement is means for rotating the vessel together with the sample and is adapted to suspend the rotation of the vessel during the measurement of the sample, and the measuring means includes light filter means for limiting the scattered light to be detected to light of specified wavelengths in the wavelength range of the light directed to the sample.

3. A sample inspecting apparatus according to claim 2, wherein the means for rotation is adapted to impart different rotations to the sample at different inspecting positions.

4. An ampoule inspecting apparatus for inspecting an ampoule having a wall capable of transmitting light and including therein a liquid sample, comprising: means for rotating the sample together with the ampoule so as to float possible foreign particles existing in the sample; measuring means for directing light m ($m \geq 2$) times to the rotating sample so as to measure the sample $m$ times and detecting the light scattered by the floating foreign particles each time the measurement is performed, the sample being regarded as defective when the intensity of the scattered light exceeds a predetermined value $n$ times out of the $m$ measurements, and defective selection setting means for setting the number $n$ at a value equal to or larger than one.

5. An apparatus according to claim 4, wherein the defective selection setting means is adapted to adjustably set the number of times of defective selection at various values depending on use conditions.

6. An apparatus according to claim 4, wherein the means for rotation is adapted to suspend the rotation of the ampoule during the measurement of the sample, and the measuring means includes light filter means for limiting the scattered light to be detected to light of specified wavelengths in the wavelength range of the light directed to the sample.

7. An apparatus to claim 4, wherein the means for rotation imparts two kinds of rotations to the sample, and $m$ and $n$ are set at two and one, respectively.

8. An apparatus according to claim 4, wherein the means for rotation comprises a rotatable ampoule support for supporting the ampoule, means for pressing the ampoule on the ampoule support, and an ampoule push bar inserted in the central portion of the ampoule support for disengaging the ampoule from the ampoule support, the ampoule support being tapered in its upper surface so as to support the ampoule in a manner of line contact.

9. An apparatus according to claim 7, wherein one of the two kinds of rotations is 2600 to 3000 r.p.m. and the other of the two kinds of rotations is 1600 to 2000 r.p.m.

10. An ampoule inspecting apparatus for inspecting an ampoule including therein a liquid sample, comprising: means for rotating the sample together with the ampoule so as to float possible foreign particles existing in the sample; measuring means for directing light twice to the sample so as to measure the sample twice and detecting the light scattered by the floating foreign particles each time the measurement is performed, and defective selection means for delivering an output signal when the intensity of the scattered light exceeds a predetermined value once out of the two measurements.

11. An apparatus according to claim 10, wherein the means for rotation is adapted to suspend the rotation of the ampoule during the measurement of the sample and to impart two kinds of rotations to the ampoule including the sample, one of the two kinds of rotations being for the first measurement and being relatively high and the other of the two kinds of rotations being for the second measurement and being lower.

12. An apparatus according to claim 10, wherein the means for rotation comprises a rotatable ampoule support for supporting the ampoule, means for pressing the ampoule on the ampoule support, and an ampoule push bar inserted in the central portion of the ampoule support for disengaging the ampoule from the ampoule support, the ampoule support being tapered with an angle $\theta$ satisfying $0 < \theta \leq 80°$ in its upper surface so as to support the ampoule in a manner of line contact.

References Cited

UNITED STATES PATENTS

| | | | |
|---|---|---|---|
| 2,531,529 | 11/1950 | Price | 356—197 |
| 2,633,772 | 4/1953 | Brown et al. | 250—223 X |
| 2,948,469 | 8/1960 | Phillips et al. | 250—222 |
| 3,217,877 | 11/1965 | Honjyo et al. | 356—197 X |

WALTER STOLWEIN, Primary Examiner

U.S. Cl. X.R.

250—222; 356—197